United States Patent
Tocze et al.

(10) Patent No.: US 8,249,519 B2
(45) Date of Patent: Aug. 21, 2012

(54) METHOD OF DETERMINING THE INSTANT OF CONSIDERATION OF A MODIFICATION OF AT LEAST ONE RECEPTION CONDITION FOR SIGNALS IN A COMMUNICATION SYSTEM

(75) Inventors: Lionel Tocze, Saint Domineuc (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 775 days.

(21) Appl. No.: 12/326,090

(22) Filed: Dec. 1, 2008

(65) Prior Publication Data

US 2009/0143024 A1 Jun. 4, 2009

(30) Foreign Application Priority Data

Nov. 30, 2007 (FR) ...................... 07 08396

(51) Int. Cl.
*H04B 1/00* (2006.01)
*H04B 7/00* (2006.01)
(52) U.S. Cl. .............. 455/69; 455/500; 455/501
(58) Field of Classification Search ............ 455/69, 455/500, 501; 709/248
See application file for complete search history.

(56) References Cited

U.S. PATENT DOCUMENTS

| 6,826,401 B1 | 11/2004 | Morvan et al. ............. 455/435.1 |
| 7,035,223 B1 | 4/2006 | Burchfiel et al. ............. 370/248 |
| 7,159,042 B1 | 1/2007 | Morvan et al. ............. 709/248 |
| 7,184,703 B1 | 2/2007 | Naden et al. ................... 455/10 |
| 2006/0136603 A1* | 6/2006 | Morvan et al. ............. 709/248 |
| 2007/0161371 A1 | 7/2007 | Dobrowski ................ 455/423 |

FOREIGN PATENT DOCUMENTS

| FR | 0755799 | 6/2007 |
| WO | 2006/126921 | 11/2006 |
| WO | 2008/057429 | 12/2008 |

OTHER PUBLICATIONS

French Search Report, dated Jul. 29, 2008, in French Application No. 0708396.

* cited by examiner

*Primary Examiner* — John Poos
(74) *Attorney, Agent, or Firm* — Fitzpatrick, Cella, Harper & Scinto (57) ABSTRACT

The invention relates to a method of determining the instant of consideration of a modification of at least one reception condition for signals in a communication system comprising at least two communication devices. The method comprises the steps, executed by a communication device, of detecting (E702) at least one modification of the reception conditions for signals in the communication system, determining (E703) the instant at which at least one other communication device will have detected the modification of the reception conditions for the signals, and establishing (E704) an operating mode of the first communication device as a function of the instant determined. The invention also relates to an associated determining device.

12 Claims, 8 Drawing Sheets

| EVM(i)(j) | i=1 | i=2 | i=3 | i=4 | i=5 |
|---|---|---|---|---|---|
| j=1 | X | $M'_{21}$, n, S | $M'_{31}$, n-1, S | $M'_{41}$, n-1, U | $M'_{51}$, n-2, S |
| j=2 | $M'_{12}$, n-2, S | X | $M'_{13}$, n-1, S | $M'_{14}$, n-1, S | $M'_{15}$, n-2, S |
| j=3 | $M'_{13}$, n-2, S | $M'_{23}$, n-1, S | X | $M'_{43}$, n-1, S | $M'_{53}$, n-2, S |
| j=4 | $M'_{14}$, n-2, U | $M'_{24}$, n-1, U | $M'_{34}$, n-2, S | X | $M'_{54}$, n-2, S |
| j=5 | $M'_{15}$, n-2, S | $M'_{25}$, n-1, S | $M'_{35}$, n-2, S | $M'_{45}$, n-2, S | X |

Fig. 5

|  | Pk_Radio received SDTC(n) | | | | |
|---|---|---|---|---|---|
| Measurement transmitted | 400 | 401 | 402 | 403 | 404 |
| 410 — $M_{12}$ | 1, -1 | 2, -1 | 3, -1 | 4, -1 | 5, -1 |
| 411 — $M_{13}$ | 1, -1 | 2, -1 | 3, -1 | 4, -1 | 5, -1 |
| 412 — $M_{14}$ | 1, -1 | 2, -1 | 3, -1 | 4, -1 | 5, -1 |
| 413 — $M_{15}$ | 1, -1 | 2, -1 | 3, -1 | 4, -1 | 5, -1 |
| 420 — $M_{21}$ | 5, -1 | 1, 0 | 2, 0 | 3, 0 | 4, 0 |
| 421 — $M_{23}$ | 5, -2 | 1, -1 | 2, -1 | 3, -1 | 4, -1 |
| 422 — $M_{24}$ | 5, -2 | 1, -1 | 2, -1 | 3, -1 | 4, -1 |
| 423 — $M_{25}$ | 5, -2 | 1, -1 | 2, -1 | 3, -1 | 4, -1 |
| $M_{31}$ | 4, -1 | 5, -1 | 1, 0 | 2, 0 | 3, 0 |
| $M_{32}$ | 4, -1 | 5, -1 | 1, 0 | 2, 0 | 3, 0 |
| $M_{34}$ | 4, -2 | 5, -2 | 1, -1 | 2, -1 | 3, -1 |
| $M_{35}$ | 4, -2 | 5, -2 | 1, -1 | 2, -1 | 3, -1 |
| $M_{41}$ | 3, -1 | 4, -1 | 5, -1 | 1, 0 | 2, 0 |
| $M_{42}$ | 3, -1 | 4, -1 | 5, -1 | 1, 0 | 2, 0 |
| $M_{43}$ | 3, -1 | 4, -1 | 5, -1 | 1, 0 | 2, 0 |
| $M_{45}$ | 3, -2 | 4, -2 | 5, -2 | 1, -1 | 2, -1 |
| $M_{51}$ | 2, -1 | 3, -1 | 4, -1 | 5, -1 | 1, 0 |
| $M_{52}$ | 2, -1 | 3, -1 | 4, -1 | 5, -1 | 1, 0 |
| $M_{53}$ | 2, -1 | 3, -1 | 4, -1 | 5, -1 | 1, 0 |
| $M_{54}$ | 2, -1 | 3, -1 | 4, -1 | 5, -1 | 1, 0 |

METHOD OF DETERMINING THE INSTANT OF CONSIDERATION OF A MODIFICATION OF AT LEAST ONE RECEPTION CONDITION FOR SIGNALS IN A COMMUNICATION SYSTEM

The present invention relates to a method of determining the instant of consideration of a modification of at least one reception condition for signals in a communication system comprising at least two communication devices.

In communication systems such as wireless communication networks consisting of several communication devices, it is necessary to ascertain the signal reception conditions between the various communication devices.

In general, a communication device centralizes the monitoring of the reception conditions and notifies the other communication devices of any modifications of the signal reception conditions between the various communication devices.

This centralized architecture generates latency problems in informing the various communication devices which are not compatible with certain applications.

The aim of the invention is to solve the drawbacks of the prior art by proposing a method and a device for determining the instant of consideration of a modification of at least one reception condition for signals in a communication system which does not have a centralized architecture.

To this end, according to a first aspect, the invention proposes a method of determining the instant of consideration of a modification of at least one reception condition for signals in a communication system comprising at least two communication devices, characterized in that the method comprises the steps, executed by a first communication device, of:
- detecting at least one modification of the reception conditions for signals in the communication system,
- determining the instant at which at least one second communication device will have detected the modification of the reception conditions for the signals, and
- establishing an operating mode of the first communication device as a function of the instant determined.

Correlatively, the present invention relates to a device for determining the instant of consideration of a modification of at least one reception condition for signals in a communication system comprising at least two communication devices, characterized in that the determining device is included in a first communication device and comprises:
- means for detecting at least one modification of the reception conditions for signals in the communication system,
- means for determining the instant at which at least one second communication device will have detected the modification of the reception conditions for the signals, and
- means for establishing an operating mode of the first communication device as a function of the instant determined.

Thus, it is possible to detect any modification of at least one reception condition for signals in a communication system without the communication system having a centralized architecture.

By determining the instant at which at least one second communication device will have detected the modification of the reception conditions for the signals and by giving consideration to the modification as a function of the instant determined, each communication device will perform the consideration at the same moment. The communication devices are thus able to give consideration to a modification at the same instant. This is particularly beneficial when the communication devices are synchronous.

According to a particular mode of the invention, the first communication device:
- determines information representative of the reception conditions for signals received by the first communication device,
- receives information representative of the reception conditions for signals received by the said at least one second communication device,
- and the at least one modification of the signal reception conditions is detected on the basis of all the information representative of the reception conditions.

Thus, information on the whole of the communication system is available to the first communication device.

According to a particular mode of the invention, the first communication device, sends, in a first time interval of a set of time intervals, information representative of the reception conditions for signals received by the first communication device, and the information received and representative of the reception conditions for signals received by the said at least one second communication device is received from the said at least one second communication device in at least one second time interval of the set of time intervals.

Thus the communication devices are able to exchange information in a synchronous manner.

According to a particular mode of the invention, the instant at which at least one second communication device will have detected the modification of the reception conditions for the signals is determined as a function of the position of the first time interval with respect to the said at least one second time interval in the set of time intervals.

Thus, the determination of the instant at which at least one second communication device will have detected the modification of the reception conditions for the signals is performed in a simple manner.

According to a particular mode of the invention, the first communication device sends in the first time interval information representative of the reception conditions for signals received by the said at least one second communication device.

Thus, by relaying the information representative of the reception conditions for signals received by the at least one second communication device in the first time interval, information is prevented from not being received by a communication device.

According to a particular mode of the invention, the information representative of the reception conditions for signals received by the first communication device and the information representative of the reception conditions for signals received by the said at least one second communication device are sent in the first time interval according to a predetermined order.

Thus, it is not necessary to indicate between which communication devices the information refers.

According to a particular mode of the invention, the said at least one modification of the reception conditions for the signals is detected on the basis of variations of the information received or determined representative of the reception conditions with respect to other reception conditions stored in the first communication device.

Thus, the modification of the signal reception conditions is carried out simply.

According to a particular mode of the invention, the at least one modification of the signal reception conditions is detected on the basis of variations of the information received representative of the reception conditions if the information received has not been received previously.

Thus, even if the information is relayed, the communication device considers the information only once.

According to a particular mode of the invention, the detection of at least one modification of the reception conditions for the signals is broken down into substeps of:
- first determination whether at least one variation in an item of information received or determined representative of a reception condition with respect to another reception condition stored in the first communication device is greater than a first predetermined threshold,
- if the said at least one variation is greater than the first predetermined threshold, second determination whether all the variations in new information received or determined representative of the reception conditions with respect to other new reception conditions stored in the first communication device are less than a second predetermined threshold, and
- in the case of a second positive determination, detecting the modification of the signal reception conditions.

Thus, a modification of the reception conditions for the signals is given consideration only in a stable situation. The present invention avoids giving consideration to any modification so long as the reception conditions vary. The first and second thresholds can be identical or different.

According to a particular mode of the invention, the modification of the reception conditions for the signals is detected if all the variations of the new information received or determined representative of the reception conditions with respect to the other new reception conditions stored in the first communication device are less than the second predetermined threshold during a predetermined time.

Thus, a modification of the reception conditions for the signals is given consideration only in a stable situation. The present invention avoids taking into account any modification so long as the reception conditions vary.

The invention also relates to a computer program stored on an information medium which, when it is loaded and executed by a computer or a processor in a device, allows the device to implement the method previously described.

According to a further aspect of the present invention there is provided a method for managing a first communication device following modification of at least one reception condition for signals in a communication system, which communication system includes a plurality of communication devices including the first communication device, wherein the method is executed by said first communication device and comprises:
- detecting at least one modification of the reception conditions for signals in the communication system,
- determining the instant at which at least one second communication device will have detected the at least one modification of the reception conditions for the signals, and
- varying a parameter of the first communication device in response to the modification of the reception conditions, the variation being effected at a time determined based on the determined instant.

The parameter may be a time that the first communication device transmits packets in the transmission cycle. Alternatively, the parameter could be signal strength, coding system for the signal, configuration of the communication system (identity of relay communication devices etc.), frequency of the signal, or some other parameter. The time determined based on the determined instant could be set such that the parameter is varied at the determined instant, at the end of a transmission cycle including the determined instant, a fixed time after the determined instant, or at some other time based on the determined instant. In some embodiments, the parameter could be varied at a time before the determined instant—the system working because the behaviour of each of the communication devices is predictable.

The above-mentioned characteristics of the invention, as well as others, will be more clearly apparent on reading the following description of an exemplary embodiment, the said description being given in conjunction with the appended drawings, among which.

Figure 1:
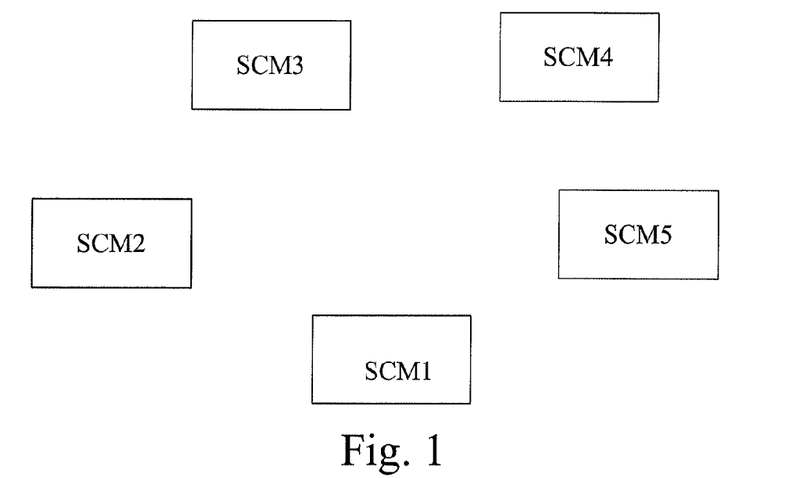
FIG. 1 represents a communication system in which the present invention is implemented.

The communication system is a radio communication system which preferably uses a frequency spectrum situated around 60 GHz. The communication system such as represented in the example of FIG. 1 comprises five communication devices SCM1 to SCM5. The communication devices will subsequently be called synchronous communication modules SCM1 to SCM5.

The communication system is for example a set of wireless speakers and a TV arranged for exchange of audio data. The synchronous communication module SCM1 is for example housed in an audiovisual reproduction system, such as a flat-screen television, and ensures the transfer of audio data to the synchronous communication modules SCM2 to SCM5. The synchronous communication modules SCM2 to SCM5 are respectively included in an audio playback device consisting of at least one loudspeaker.

The communication modules are termed synchronous and they send or receive data during allotted time intervals.

When the communication system is used for audio data transfer, the latter is placed in a room of a residence. When people move around in the room or when the layout of the synchronous communication modules SCM is modified in the room, or when furniture is added, removed or shifted around in the room, the conditions of communication between the synchronous communication modules SCM are modified.

Subsequently, the radio linkup which connects two synchronous communication modules SCM will be called a link.

In FIG. 1, five synchronous communication modules SCM are represented. Of course, the communication system can comprise a larger or smaller number of synchronous communication modules SCM.

Figure 2:
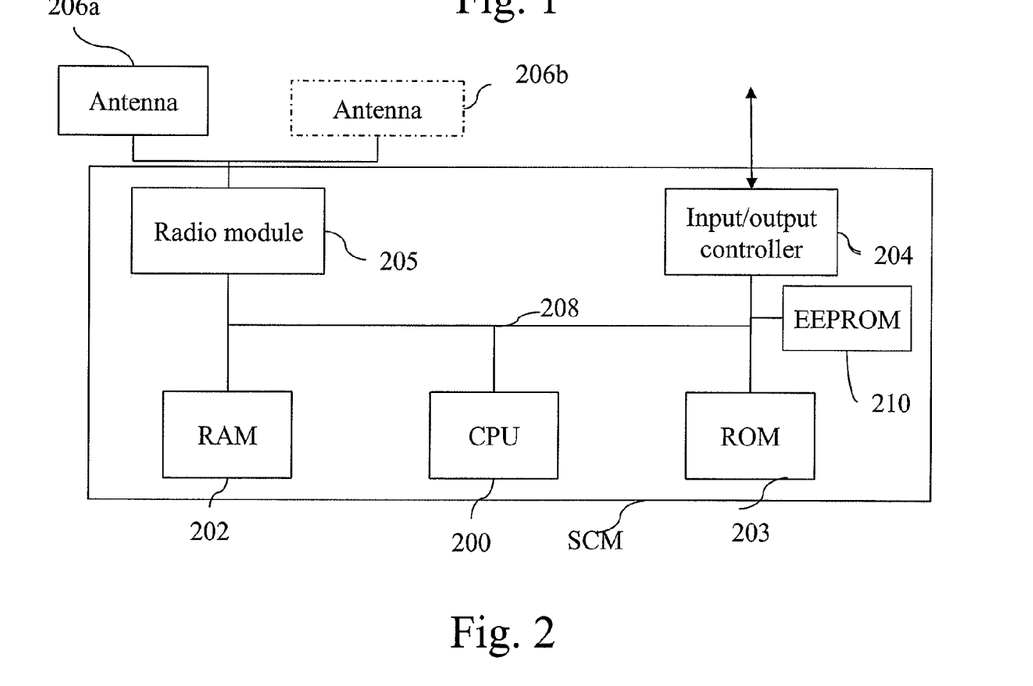
FIG. 2 represents a communication device in which the present invention is implemented.

FIG. 2 represents a communication device embodying the present invention.

The synchronous communication module SCM is composed of an input/output controller 204 responsible for connection with devices such as equipment generating audio data to be transmitted or equipment for reproducing the audio data received. The input/output controller 204 is for example in accordance with the SPDIF, IEEE1394 or HDMI standards. The equipment provides multi-channel digital audio data to the synchronous communication module SCM1 or reproduces the audio data received by the synchronous communication modules SCM2 to SCM5.

The synchronous communication module SCM also comprises a processor CPU 200, a random access memory RAM 202 used by the processor 200 to store the temporary data necessary for the implementation of the various algorithms.

The synchronous communication module SCM also comprises a read only memory ROM 203 containing the program executed by the processor 200, a persistent random access memory 210 of EEPROM type which allows the SCM to preserve the information necessary for the algorithms.

The synchronous communication module SCM also comprises a radio module 205 and at least one set of antennas 206 which allow the transmission and/or reception of the data transferred according to the present invention. A set of antennas 206 makes it possible to concentrate the electromagnetic waves sent in a direction or to concentrate the reception of the electromagnetic waves in a given direction.

Preferably, the synchronous communication module SCM1 comprises two sets of antennas 206*a* and 206*b*. The synchronous communication modules SCM2 to SCM5 each comprise one set of antennas 206*a*.

The radio module 205 preferably comprises means for coding and for correcting errors, for example of Viterbi and/or Reed-Solomon type.

The radio module 205 also comprises means for determining information representative of the reception conditions for signals received by the synchronous communications module SCM1. These signals are sent by the other synchronous communication modules SCM2 to SCM5. The information representative of the reception conditions for signals received by the synchronous communication module SCM1 from the other synchronous communication modules SCM2 to SCM5 is, for example, measurements of the quality of the signals received from the other synchronous communication modules SCM.

Figure 3:
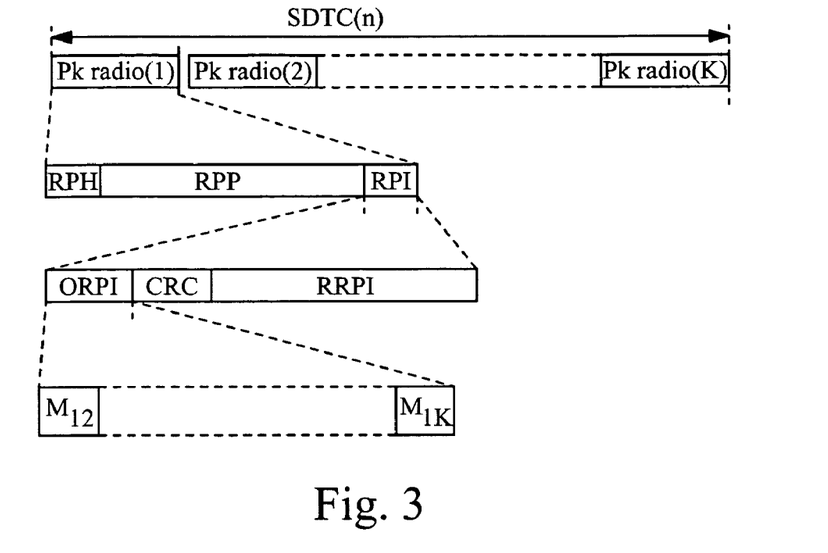
FIG. 3 represents the organization of the data transferred in a set of time intervals.

FIG. 3 represents the organization of the data transferred in a set of time intervals.

In a set of time intervals, known as a data transmission cycle SDTC(n) where n represents the index of the data transmission cycle, each synchronous communication module SCMi, with i=1 to 5, successively transmits a radio packet denoted Pk_radio (i) in a synchronous manner.

Each radio packet Pk_radio(i) consists of a header field RPH, a useful data field RPP, and an information field RPI. The radio packet header field RPH comprises the number of data transmission cycles SDTC(n) sent since the system was turned on, as well as an identifier of the radio packet sent. The useful data field RPP (or "Radio Packet Payload") comprises the transmitted audio data. The information field RPI ("Radio Packet Information") comprises, according to the embodiment, the information representative of the reception conditions for the signals received by the synchronous communication modules SCM(i) sending the radio packet denoted Pk_radio (i).

More precisely, each item of information representative of the reception conditions for signals received corresponds to a measurement of RSSI ("Radio Signal Strength Indicator") performed by a synchronous communication module SCMi on receipt of a radio packet sent by a synchronous communication module SCMj. As a variant, each item of information representative of the reception conditions for signals received corresponds to a measurement of SNR, acronym of "Signal to Noise Ratio".

It should be noted here that when a measurement of RSSI is considered to be erroneous, the latter is replaced with a predetermined identifier known to all the synchronous communication modules SCM.

More precisely, the information field RPI consists of an information subfield for so-called ORPI original information ("Original Radio Packet Information"), a CRC subfield for protecting the ORPI data, and a data relay subfield.

The original-information subfield ORPI ("Original Radio Packet Information"), corresponds to the RSSI measurements measured by the synchronous communication module SCMi during the previous radio packet transmissions by the other synchronous communication module SCMj with i≠j. The RSSI measurements measured by the synchronous communication module SCMi on the signals sent by a synchronous communication module SCMj are denoted $M_{ij}$.

The CRC subfield for protecting the ORPI information allows the synchronous communication module SCM that is the recipient of the packet to be certain that the ORPI information has not been corrupted by disturbances related to the radio channel.

The data relay subfield denoted RRPI ("Relayed Radio Packet Information") comprises data measured by the other synchronous communication modules SCM and makes it possible to ensure the reception, by all the synchronous communication modules SCM, of the measurements of RSSI even when a fixed or temporary obstacle is present in the communication system. The subfield RRPI consists of the concatenation of the (K−1) ORPIs received from the other synchronous communication modules SCM, where K is the number of synchronous communication modules SCM and of their associated CRCs.

The ORPI and RRPI information is transmitted by each synchronous communication module SCM, in a fixed order known to the other synchronous communication modules SCM of the communication system in such a way that each synchronous communication module SCM can identify, without additional information, to which link the item of information corresponds. This order is known, for each of the radio packets sent, by means of a Measurements Transmission Matrix MTM.

Figure 4:
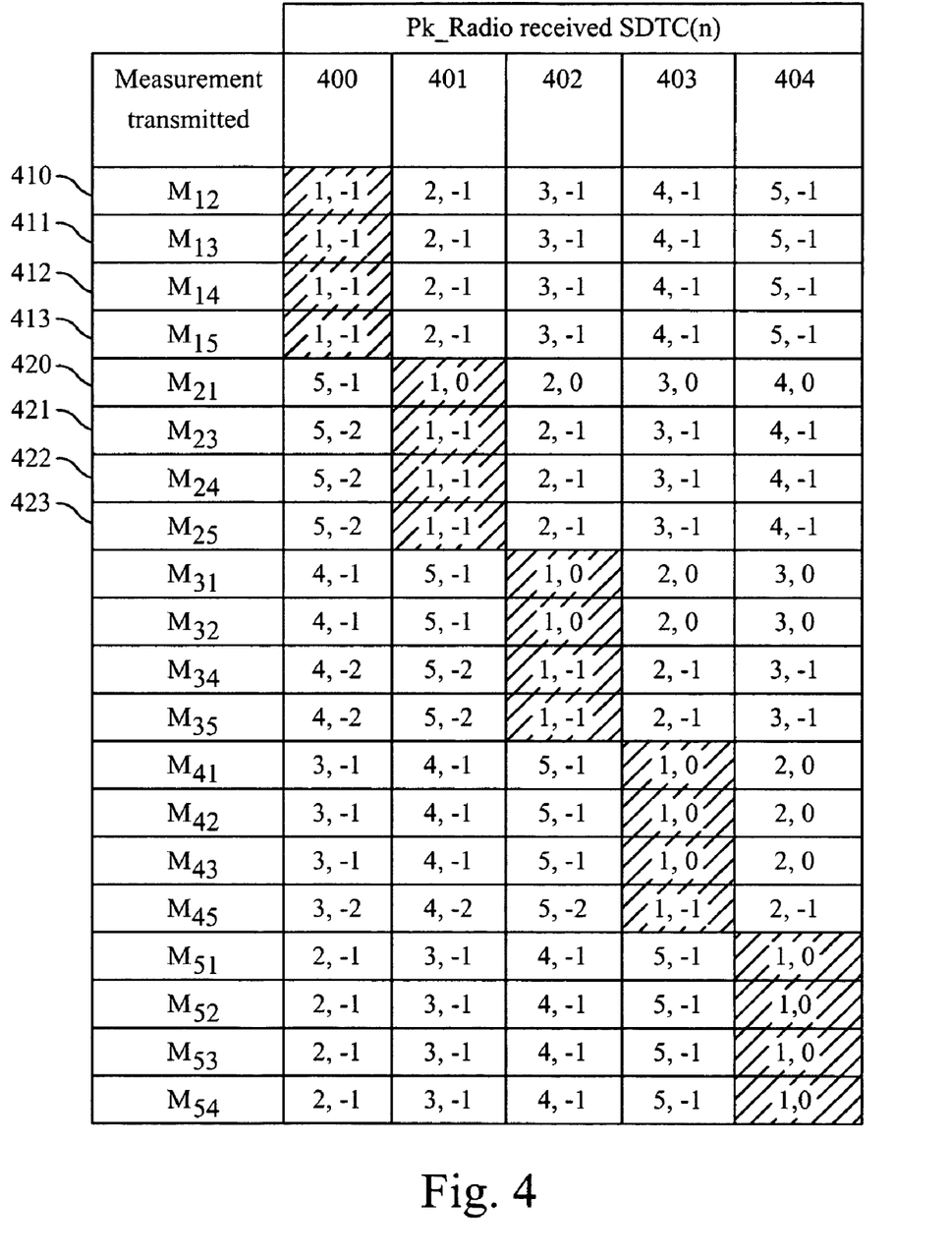
FIG. 4 represents an exemplary transmission matrix of measurements used when the communication system comprises five synchronous communication modules.

FIG. 4 represents an exemplary measurements transmission matrix used when the communication system comprises five synchronous communication modules.

Each synchronous communication module SCM included in the communication system stores the same measurements transmission matrix MTM.

The measurements transmission matrix MTM comprises K columns and K(K−1) rows where K is the number of synchronous communication modules SCM included in the communication system.

Thus, the measurements transmission matrix MTM according to the example of FIG. 4 comprises five columns and twenty rows.

Column 400 comprises the information relating to the first packet Pk_Radio(1) included in the data transmission cycle SDTC(n) and sent by the synchronous communication module SCM1, column 401 comprises the information relating to the second packet Pk_Radio(2) included in the data transmission cycle SDTC(n) and sent by the synchronous communication module SCM2, column 402 comprises the information relating to the third packet Pk_Radio(3) included in the data transmission cycle SDTC(n) and sent by the synchronous communication module SCM3, column 403 comprises the information relating to the fourth packet Pk_Radio(4) included in the data transmission cycle SDTC(n) and sent by the synchronous communication module SCM4 and column 404 comprises the information relating to the fifth packet Pk_Radio(5) included in the data transmission cycle SDTC(n) and sent by the synchronous communication module SCM5.

Because the communication system involves relaying, any given measurement is transmitted a number of times. For example, in present embodiment, after being transmitted a first time by the SCM which made the measurement in the first place, the measurement is relayed on four occasions by "relaying" SCMs other than the original "measuring" SCM.

Each element of the matrix is a pair of values. The first value starting from the left indicates the number (denoted $N_{em}$) of sends performed for the measurement considered. Thus, Nem=1 denotes a first transmission of a measurement, made by the original measuring SCM, and Nem=2 or higher denotes a subsequent transmission (or relay transmission) by a relaying SCM. The other value is the relative index of the data transmission cycle SDTC in which the measurement has been performed with respect to the data transmission cycle SDTC in which the measurement is sent. Stated otherwise, the index is equal to the difference between the index of the data transmission cycle SDTC in which the measurement has been performed and the index of the data transmission cycle SDTC in which the measurement is sent.

The elements included in the intersections of column 400 and of the respective rows 410 to 413 correspond to the measurements transmitted in the field ORPI by the synchronous communication module SCM1. The intersection of column 400 and of row 410 corresponds to the measurement of RSSI $M_{12}$ performed by the synchronous communication module SCM1 on a packet sent in the previous data transmission cycle SDTC by the synchronous communication module SCM2. The intersection of column 400 and of row 411 corresponds to the measurement of RSSI $M_{13}$ performed by the synchronous communication module SCM1 on a packet sent in the previous data transmission cycle SDTC by the synchronous communication module SCM3. The intersection of column 400 and of row 412 corresponds to the measurement of RSSI $M_{14}$ performed by the synchronous communication module SCM1 on a packet sent in the previous data transmission cycle SDTC by the synchronous communication module SCM4. The intersection of column 400 and of row 413 corresponds to the measurement of RSSI $M_{15}$ performed by the synchronous communication module SCM1 on a packet sent in the previous data transmission cycle SDTC by the synchronous communication module SCM5.

Thus, the value $N_{em}$ is equal to 1 for each of the measurements $M_{12}$, $M_{13}$, $M_{14}$ and $M_{15}$, since this then corresponds to the first send of the measurement concerned. Since the measurement has been performed during the SDTC prior to the data transmission cycle SDTC(n) currently being sent, the value of the index is −1.

The intersection of column 400 and of row 420 corresponds to the measurement of RSSI $M_{21}$ performed by the synchronous communication module SCM2 on a packet sent in the previous data transmission cycle SDTC by the synchronous communication module SCM1. The intersection of column 400 and of row 421 corresponds to the measurement of RSSI $M_{23}$ performed by the synchronous communication module SCM2 on a packet sent two data transmission cycles SDTC prior to the current data transmission cycle SDTC by the synchronous communication module SCM3. The intersection of column 400 and of row 422 corresponds to the measurement of RSSI $M_{24}$ performed by the synchronous communication module SCM2 on a packet sent two data transmission cycles SDTC prior to the current data transmission cycle SDTC by the synchronous communication module SCM4. The intersection of column 400 and of row 413 corresponds to the measurement of RSSI $M_{25}$ performed by the synchronous communication module SCM2 on a packet sent two data transmission cycles SDTC prior to the current data transmission cycle SDTC by the synchronous communication module SCM5.

The four elements at the intersections of column 400 with rows 420, 421, 422 and 423 correspond to the relays by SCM1 of the measurements $M_{21}$ to $M_{25}$ performed by the synchronous communication module SCM2. They are included in the data relay subfield RRPI of the RPI field of the first packet Pk_Radio(1).

Thus, the synchronous communication module SCM1 relays or sends the information dispatched during the previous data transmission cycle SDTC (n−1) by the synchronous communication module SCM2 and already retransmitted by the synchronous communication modules SCM3 to SMC5 during the previous data transmission cycle SDTC (n−1). The value $N_{em}$ is equal to 5, since this then corresponds to the fifth send of the same measurement.

Moreover, during the previous data transmission cycle SDTC (n−1), since the synchronous communication module SCM2 sends in the data transmission cycle SDTC (n−1) after the synchronous communication module SCM1, the synchronous communication module SCM2 was able to measure the value $M_{2,1}$ of the previous data transmission cycle SDTC (n−1). The value of the relative index of the data transmission cycle SDTC is therefore equal to −1 for the measurement $M_{21}$ in column 400. The other measurements $M_{23}$, $M_{24}$ and $M_{25}$, correspond to the measurements performed during the data transmission cycle SDTC (n−2), and the value of the relative index of the data transmission cycle SDTC is therefore equal to −2 for each of these measurements.

The SCM1 also relays in the data relay subfield RRPI of the first packet Pk_Radio(1) the further measurements $M_{31}$, $M_{32}$, ... $M_{54}$ shown in the elements at the intersections of column 400 with the remaining rows following row 423.

The contents of the ORPI and RRPI subfields for the second packet Pk_Radio(2) transmitted by SCM2 in the current data transmission cycle SDTC(n) can be understood from column 401 in FIG. 4, in which the shaded elements denote ORPI contents.

Concerning the intersections of column 401 and rows 420 to 423, the value of the relative index of the data transmission cycle SDTC in which the measurement has been performed, with respect to the data transmission cycle SDTC where the item of information is sent are 0, −1, −1 and −1 respectively for the measurements $M_{21}$, $M_{23}$, $M_{24}$ and $M_{25}$.

Figure 5:
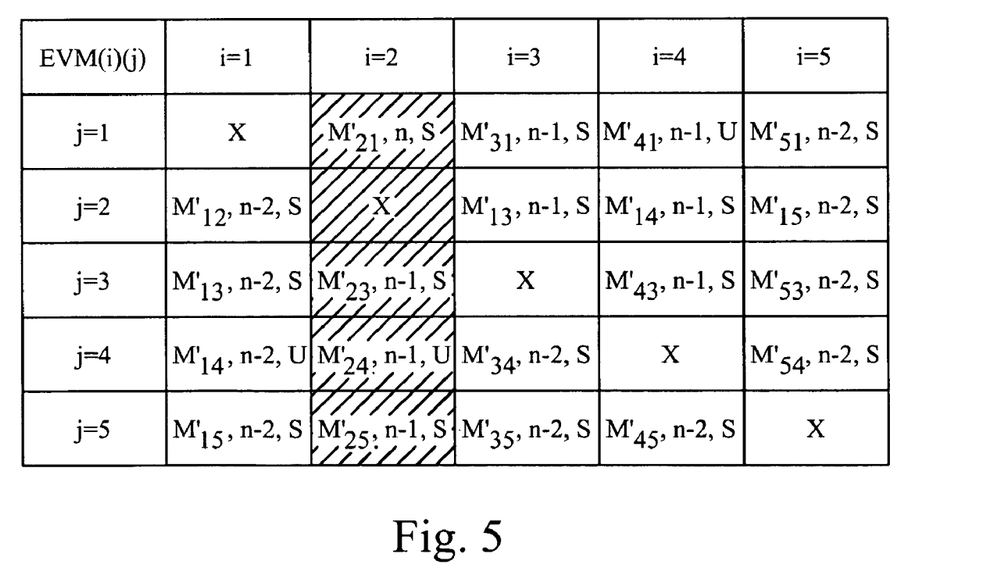
FIG. 5 represents an exemplary table of evolution of the measured values when the communication system comprises five synchronous communication modules.

FIG. 5 represents an exemplary table of evolution of the measured values when the communication system comprises five synchronous communication modules.

Each synchronous communication module SCM maintains a table of Evolution of the Values Measured (EVM).

The example of FIG. 5 represents the table of Evolution of the Values Measured EVM of the synchronous communication module SCM2 in a communication system comprising five synchronous communication modules SCM1 to SCM5. The EVM table is reupdated periodically at the end of each packet Pk_Radio sending.

For the rest of the description, the situation is regarded as being the end of sending of the Pk_Radio(2) of the data transmission cycle SDTC(n) of FIG. 3.

The EVM table consists of K*(K−1) elements, corresponding to all of the links between each synchronous communication module SCM of the communication system. It should be noted that K non-significant elements, the K elements of the diagonal, appear in FIG. 5 for reasons of ease of representation of the table.

Each column of the EVM table corresponds to a synchronous communication module SCMi receiving a packet. Each row corresponds to a synchronous communication module SCMj sending a packet. Each element of the table contains the value of the last RSSI measurement $M'_{ij}$, of the link between the communication module SCMi performing the measurement and the communication module SCMj having sent the packet, an SDTC data transmission cycle index denoted $SDTC_{mem}$ and an indicator of the evolution of the link. The value of the last measurement $M'_{ij}$ is stored in memory and is used to follow the evolution of the reception conditions on the link between the receiver synchronous communication module SCMi and the sender synchronous communication module SCMj. The SDTC data transmission cycle index $SDTC_{mem}$ is the index of the data transmission cycle SDTC in which the measurement $M'_{ij}$ has been measured. The indicator of the evolution of the link $State_{evol}$ takes two possible values in the EVM table.

A value representative of an instability, denoted U ("Unstable"), corresponding to the detection of a large variation in the reception conditions for the signals on a link. This variation is caused for example by the appearance of obstacles in a temporary or non-temporary manner. In FIG. 5 it can be seen that instability has been detected on the links between SCM1 and SCM4 (both directions) and from SCM4 to SCM2.

A value representative of stability of the link, denoted S ("Stable"), corresponds to an absence of variation of the reception conditions for the signals on a link or to a weak variation of the signal reception conditions on the link.

Figure 6:
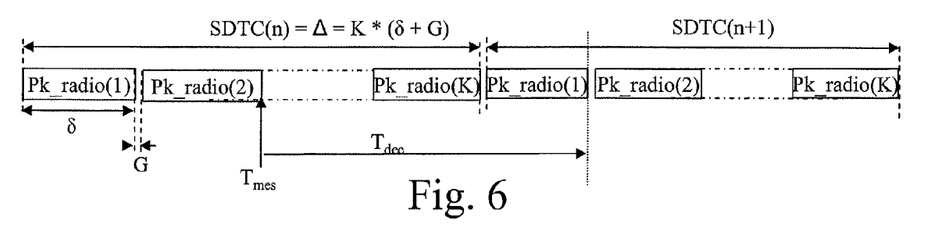
FIG. 6 represents two sets of time intervals.

FIG. 6 represents two sets of time intervals.

FIG. 6 comprises two data transmission cycles SDTC(n) and SDTC(n+1). Each data transmission cycle SDTC(n) consists of K packets Pk_radio(1) to Pk_radio(K). Each packet has a fixed duration δ known to each synchronous communication module SCMk with k=1 to K. The duration of a data transmission cycle SDTC is therefore equal to:

$$\Delta = K*(\delta+G)$$

Where K represents the number of synchronous communication modules SCM of the communication system, G represents a guard time. This guard time takes account of the time interval necessary for each synchronous communication module SCM to configure its set of antennas 206 so as to concentrate the reception of the electromagnetic waves towards the next synchronous communication module SCM sending a packet according to the predefined order of transmission of the data transmission cycle SDTC. The guard time G also makes it possible to take into account the clock drifts of each synchronous communication module SCM so as to guarantee the synchronization of the system.

The knowledge of these parameters and of the information of the matrix MTM allows each synchronous communication module SCM, on the basis of an instant $T_{mes}$ corresponding to the end of the sending of a packet by a synchronous communication module SCM, and on the basis of the detection of at least one modification of the reception conditions for signals in the communication system, to determine a lag $T_{dec}$, on the basis of which all the synchronous communication modules SCM will have determined the modification of the reception conditions for signals in the communication system. Each synchronous communication module SCM can thus on the basis of the instant $T_{mes}$ and of the lag $T_{dec}$, determine the instant at which all the other synchronous communication modules SCM will have detected the modification of the reception conditions for the signals in the communication system.

It should be noted that for a given radio link, each synchronous communication module SCM has available its own instant $T_{mes}$ and its own calculation of the $T_{dec}$.

It should be noted here that in a particular embodiment of the present invention, the instant $T_{end}$ of the end of a stable state of the communication system is determined. A stable state of the communication network is a state in which the variations in the information representative of signal reception conditions are less than a predetermined threshold.

According to the invention, the instant $T_{end}$ is determined by each synchronous communication module SCM.

Figure 7:
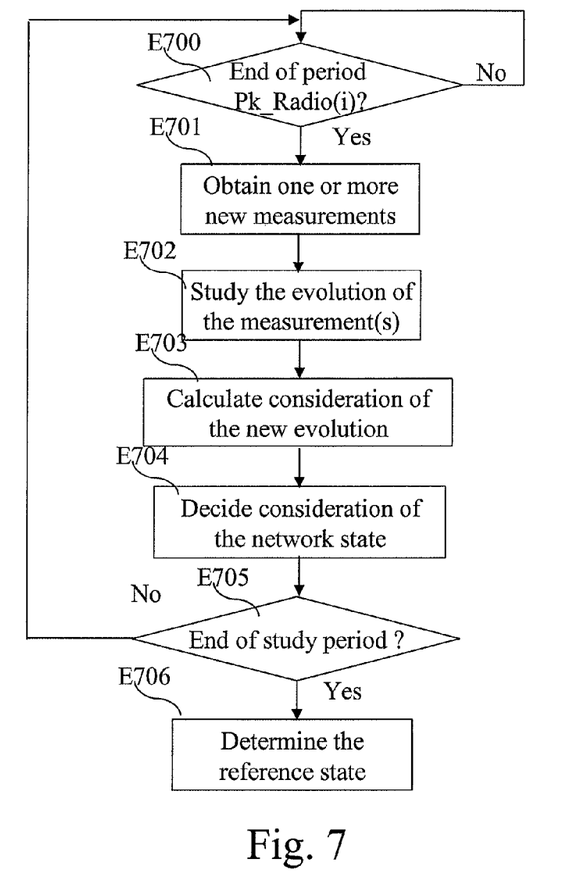
FIG. 7 represents an algorithm for determining the instant of consideration of a modification of at least one reception condition for signals in a communication system comprising at least two communication devices.

FIG. 7 represents an algorithm for determining the instant of consideration of a modification of at least one reception condition for signals in a communication system comprising at least two communication devices.

FIG. 7 represents the general algorithm of the invention. This algorithm is executed by the processor 200 of each synchronous communication module SCMk with k=1 to K.

The present algorithm will be described when it is executed by the processor 200 of the synchronous communication module SCM1.

The present algorithm is executed for a predetermined duration known to all the synchronous communication modules SCM of the communication system. For example, this study is performed repetitively during a number M of data transmission cycles SDTC.

In step E700, the processor 200 determines whether the situation is the end of a packet Pk_Radio reception period. For this purpose, the processor 200 receives from the radio module 205 a notification of the reception of a packet Pk_Radio or the notification of the deadline of a duration (δ+G) from the last reception of a packet Pk_Radio. The notification of the deadline of a duration (δ+G) from the last reception of a packet Pk_Radio corresponds to an absence of reception of a packet Pk_Radio due, for example, to the presence of an obstacle between the synchronous communication module SCM having sent the packet Pk_Radio and the synchronous communication module SCM1 assumed to receive the packet Pk_Radio.

In the following step E701, the processor 200 obtains at least one new RSSI measurement. More precisely, the processor 200 obtains the measurement of the quality of each link $M_{1k}$ with k=2 to K as well as the measurements included in the subfield ORPI which correspond to the measurements performed by the synchronous communication module SCM having sent the packet Pk_Radio as well as the measurements included in the subfield RRPI relayed by the synchronous communication module SCM having sent the packet Pk_Radio. It should be noted here that the processor 200 does not process the measurements included in the subfield RRPI which have already been received.

In the following step E702, the processor 200 triggers a detection procedure for modifying the reception conditions for signals transmitted in the communication system. For this purpose, the processor 200 studies the evolution of the measurement or measurements obtained with respect to measurements stored previously. The procedure for studying the evolution of the measurement or measurements obtained is executed on the basis of the measurement or measurements obtained and the corresponding measurement or measurements stored in the EVM table previously described with reference to FIG. 5.

Two measurements will be regarded as stable if the absolute value of the difference between the measurement $M_{ij}$ obtained and the corresponding measurement $M'_{ij}$ stored in the EVM table is less than a predetermined percentage, for example 10%, of the corresponding measurement $M'_{ij}$ stored in the EVM table. In the converse case, the processor 200 regards the measurements as unstable and marks the corresponding link as unstable.

In this same step, the processor 200 stores at least one item of information representative of the state which the communication system is in.

In the following step E703, the processor 200 calculates a duration, on expiry of which each synchronous communication module SCM of the communication system will have detected the modification of the reception conditions for the signals transmitted in the communication system by studying the evolution of the measurement or measurements with respect to previously stored measurements. Knowing the duration on expiry of which each synchronous communication module SCM of the communication system will have detected the modification of the reception conditions for the signals transmitted in the communication system and the current time, the processor 200 determines the instant at which all the other synchronous communication modules SCM will have detected the modification of the reception conditions for the signals in the communication system.

In the following step E704, the processor 200 decides the instant of consideration of the modification as a function of the instant determined. Stated otherwise, the processor 200 establishes an operating mode of the synchronous communication module SCMi as a function of the instant determined. The consideration of the modification or the establishment of the operating mode is performed by modifying for example the order of transmission of the packets in the data transmission cycle SDTC.

The order of transmission of the packets in the data transmission cycle SDTC is determined by determining which links, termed filiation links, have measurements of RSSI greater than a predetermined threshold. On the basis of a selection of the filiation links, a hierarchical tree is determined whose root is the sender synchronous communication module SCMi as a function of at least one spatial diversity rule. The hierarchical tree defines at least one relay receiver synchronous communication module SCM and allows the reception of the content by all the synchronous communication modules SCM. Thereafter, the order of transmission of the packets is determined on the basis of the hierarchical tree so that, between access by the relay synchronous communication module or modules SCM and access by the receiver synchronous communication module or modules SCM which is (are) linked to it (them) by the filiation links of the hierarchical tree, the access sequence envisages that at least one other synchronous communication module SCM accesses the communication network.

Further details regarding this method of determining the order of transmission of the packets can be found in our co-pending French patent application no. FR0755799, or corresponding PCT application no. PCT/EP2008/057429.

In the following step E705, the processor 200 verifies that the end of the system study time has not elapsed. This consists for example here in verifying that the number of data transmission cycles SDTC transmitted from the start of the algorithm is greater than the predetermined value M. In the negative, the processor 200 returns to step E700. In the affirmative, the processor 200 goes to step E706 and determines from among the set of stored stable states, the state regarded as the state of the system.

This reference state is for example chosen as the state whose duration aggregated over the study period is the longest. This state then serves as input parameter for example for choosing the data retransmission policy.

FIGS. 8a to 8e represent a detailed algorithm for determining the instant of consideration of a modification of at least one reception condition for signals in a communication system comprising at least two communication devices.

The algorithm represented in FIG. 8a to 8e is executed by the processor 200 of each synchronous communication module SCMk with k=1 to K.

Figure 8A:
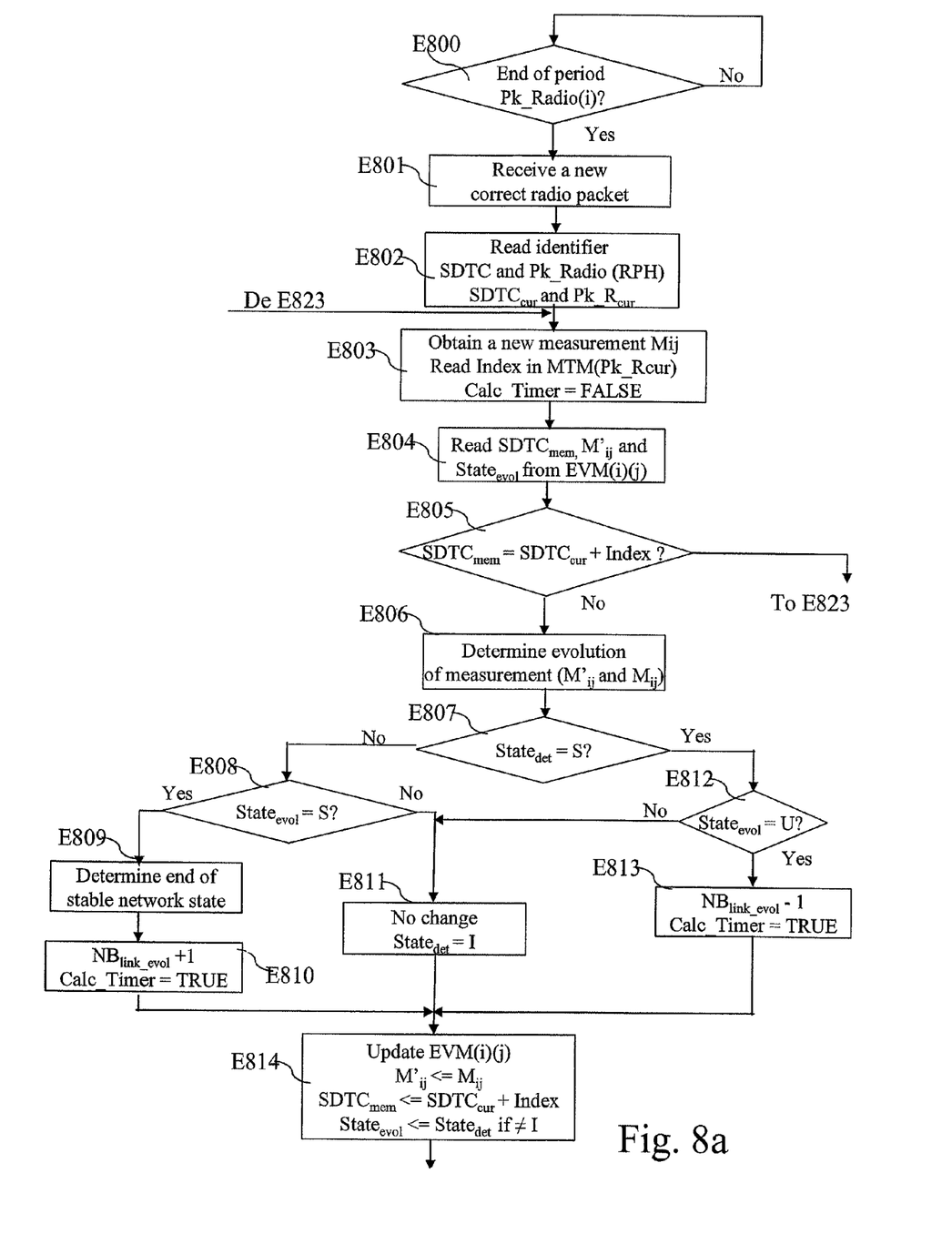
FIGS. 8a to 8e represent a detailed algorithm for determining the instant of consideration of a modification of at least one reception condition for signals in a communication system comprising at least two communication devices.

During power-up of the synchronous communication module SCM, several variables are initialized. A first variable $NB_{link\_evol}$ is initialized to 0. The variable $NB_{link\_evol}$ makes it possible to meter the number of links for which the signal reception conditions are modified. The signal reception conditions are modified on a link when the measurement of RSSI evolves with respect to a measurement of RSSI previously stored for the link.

A second Confirm_State variable is initialized to the value FALSE. The Confirm_State variable is used to adjust the determination of the instant of the end of a stable communication system state. The communication system is regarded as stable when, for each link, the measurement of RSSI does not evolve with respect to a measurement of RSSI previously stored for the link.

A third variable NB_Timer_Dec is initialized to the value 0. The variable NB_Timer_Dec makes it possible to meter the number of decision lag $T_{dec}$ whose value is contained in a list List_Timer_Dec.

In step E800 of FIG. 8a, the processor 200 determines whether the situation is the end of a packet reception period in the same manner as that described in step E700 of FIG. 7. If it is the end of a packet reception period, the processor 200 goes to step E801.

In step E801, the processor 200 verifies whether the Pk_Radio radio packet received is correct with the aid of the CRC associated with the subfield ORPI or with the CRC included in the subfield RRPI. If a measurement included in the subfield ORPI or RRPI is corrupted, the processor 200 ignores the latter and goes to the following measurement.

In the following step E802, the processor 200 reads the header RPH of the packet received, stores in the variable $SDTC_{cur}$ the current value n of the data transmission cycle SDTC(n), stores in the variable $Pk\_R_{cur}$ the current value k of the packet received Pk_Radio(k) and thus identifies the synchronous communication module SCMk that sent the packet Pk_Radio(k).

In the following step E803, the processor 200 reads a first measurement $M_{ij}$ included in the packet received. The measurements $M_{ij}$ being placed in the packet Pk_Radio(k) in a predetermined order, the processor 200 is able to determine, as a function of the position of the measurement $M_{ij}$ in the packet Pk_Radio(k), to which link the measurement $M_{ij}$ corresponds or which is the synchronous communication module SCMj which has sent the packet Pk_Radio(j) on which the synchronous communication module SCMi has performed the measurement $M_{ij}$. Moreover, the processor 200 determines, on the basis of the matrix MTM and of the variable $Pk\_R_{cur}$, the index denoted relative Index of the data transmission cycle SDTC in which the measurement has been performed with respect to the data transmission cycle SDTC where the measurement is sent.

In the same step, the processor 200 sets a variable Calc_Timer to the value FALSE.

In the following step E804, the processor 200 reads from the EVM table the value of the last measurement stored $M'_{ij}$, the value of the data transmission cycle SDTC corresponding to the last measurement stored $SDTC_{mem}$ and the value of the indicator of the evolution of the link $State_{evol}$.

In the following step E805, the processor 200 verifies whether the measurement $M_{ij}$ obtained in step E803 has already been given consideration. Specifically, by duplicating the measurement transmissions, it is possible to receive one and the same measurement from various synchronous communication modules SCM. For this purpose, the processor 200 compares $SDTC_{mem}$ with the value arising from the calculation of ($SDTC_{cur}$+Index). When $SDTC_{mem}$ and ($SDTC_{cur}$+Index) are equal, the measurement $M_{ij}$ obtained in step E803 has already been given consideration and the processor 200 goes to step E823 of FIG. 8b.

Otherwise, the processor 200 goes to step E806.

In step E806, the processor 200 evaluates the evolution of the measurement obtained $M_{ij}$ with respect to the corresponding measurement $M'_{ij}$ stored in the EVM table previously described with reference to FIG. 5.

The signal reception conditions are not modified on a link when the measurement of RSSI $M_{ij}$ does not evolve with respect to a measurement of RSSI previously stored $M'_{ij}$ for the link.

Two measurements do not evolve if the absolute value of the difference between the measurement $M_{ij}$ obtained and the corresponding measurement $M'_{ij}$ stored in the EVM table is less than a predetermined percentage, for example 10%, of the corresponding measurement $M'_{ij}$ stored in the EVM table. In the converse case, the processor 200 regards the signal reception conditions as modified on the link and marks the corresponding link as unstable.

If the measurements do not evolve, the processor 200 assigns the value S to the variable $State_{det}$. In the converse case, the processor 200 assigns the value U to the variable $State_{det}$. It should be noted that during this step, the processor 200 also verifies whether the value $M_{ij}$ corresponds to the predetermined identifier representative of an erroneous measurement. If the value $M_{ij}$ corresponds to the predetermined identifier representative of an erroneous measurement, the processor 200 goes to step E823 of FIG. 8b.

In step E807, the processor 200 verifies whether the variable $State_{det}$ is equal to S.

If the variable $State_{det}$ is equal to S, the processor 200 goes to step E812. If the variable $State_{det}$ is equal to U, the processor 200 goes to step E808.

In step E812, the processor 200 compares whether the value of the indicator of the evolution of the link $State_{evol}$ is equal to U.

If $State_{det}$=$State_{evol}$=S, the measurement of the link is stable from the last measurement. The processor 200 goes to step E810 and then sets the variable $State_{det}$ to the value I (for Ignore), then goes to step E814.

If $State_{det}$=S and $State_{evol}$=U, the measurement of the link has just ceased to change in a discernible manner. The situation is then the case of a measurement of a link going over to a stable value. The processor 200 then goes to step E813.

In step E813, the processor 200 decrements the value of the variable $NB_{link\_evol}$ by one unit and sets the variable Calc_Timer to the value TRUE to calculate and trigger a lag duration in considering the modification of the measurement.

This operation having been performed, the processor 200 goes to step E814.

In step E808, the processor 200 compares whether the value of the indicator of the evolution of the link $State_{evol}$ is equal to S.

If $State_{det}$=$State_{evol}$=U, the measurement of the link has continued to change in a discernible manner. From the evolution point of view, the processor 200 considers that there is no change and goes to step E811.

In step E811, the processor 200 sets the variable $State_{det}$ to the value I and goes to step E814.

If $State_{det}$=U and $State_{evol}$=S, the measurement of the link has just changed in a discernible manner, and the processor 200 goes to step E809.

In step E809, the processor 200 determines, if necessary, the instant of the end of the previous stable state of the communication system. Step E809 will be described more precisely in regard to FIG. 8d.

In the following step E810, the processor 200 increments the value of the variable $NB_{link\_evol}$ and sets the variable Calc_Timer to TRUE. The processor 200 thereafter goes to step E814.

In step E814, the processor 200 updates the values of the element of the EVM table, corresponding to the measurement studied. The element of index (i,j) corresponding to the measurement $M_{ij}$ studied, is then updated by:
   storage in the information element $M'_{ij}$ of the value $M_{ij}$
   storage in the information element $SDTC_{mem}$ of the value $SDTC_{cur}$+Index
   storage in the information element $State_{evol}$ of the value $State_{det}$, only if $State_{det}$ is different from the value I (Ignore). That is to say only if an evolution is noted.

This storage step makes it possible to guarantee the tracking of the study of the evolution of the characteristics of the link (i,j), only during the reception of a new item of information for the characteristic of the updated link.

Figure 8B:
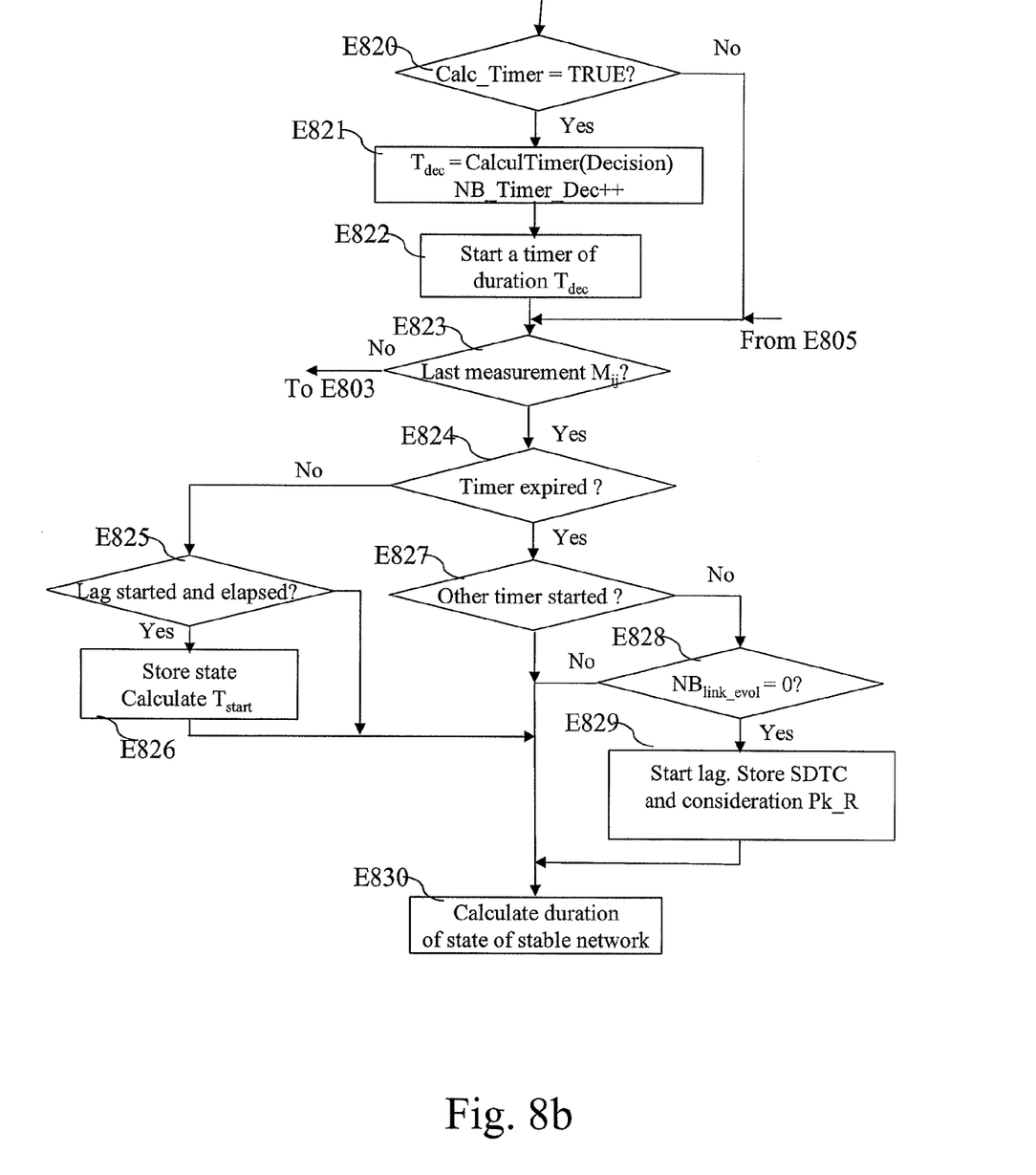

This operation having been performed, the processor 200 goes to step E820 of FIG. 8b.

In step E820, the processor 200 verifies whether a calculation of a lag in considering a modification of a characteristic of a link of the communication system must be performed. On expiry of this lag, the synchronous communication modules SCM can then determine in a distributed and common manner whether the state of the communication system is stable. Moreover in the case of a synchronous system, this determination will be simultaneous.

The test consists here in verifying whether the value Calc_Timer is equal to the value TRUE.

If such is not the case, the processor 200 goes to step E823.

In step E823, the processor 200 verifies that all the measurements received in the current Pk_Radio radio packet have been studied so as to determine the evolution of the communication system. In the negative, the processor 200 returns to step E802 and considers the following measurement.

If all the measurements received in the current Pk_Radio radio packet have been studied, the processor 200 goes to step E824.

If the value Calc_Timer is equal to the value TRUE, the processor 200 goes from step E820 to step E821.

In step E821, the processor 200 triggers a procedure CalculTimer which will be described in greater detail with reference to FIG. 8e. The procedure CalculTimer makes it possible to determine, as a function of the instant of notification of the measurement studied and the repetition scheme used for the measurements included in the subfield RPI, the duration of the lag $T_{dec}$ to have to wait so that all the other synchronous communication modules SCM have detected the modification of the reception conditions on the observed link, and therefore to determine the instant at which all the other communication devices will have detected the modification of the signal reception conditions on the observed link.

In this same step, the processor 200 increments the variable NB_Timer_Dec by one unit.

In the following step E822, the processor 200 triggers a timeout, which on completion of the lag $Td_{dec}$ permits the phase of determining the state of the communication system and the consideration of the modification of the signal reception conditions as a function of the instant determined.

In this step, the processor 200 adds to the list List_Timer_Dec an element which takes the calculated value of the lag $T_{dec}$.

This operation having been performed, the processor 200 goes to step E823 previously described.

In step E824, the processor 200 verifies whether a lag $T_{dec}$ has reached its deadline.

If at least one lag $T_{dec}$ has reached its deadline, the processor 200 goes to step E827. Otherwise, the processor 200 goes to step E825.

In step E827, the processor 200 updates the value NB_Timer_Dec by subtracting from NB_Timer_Dec the number of lags $T_{dec}$ satisfying the condition of the test E824. The list of the decision durations List_Timer_Dec is also updated.

In this same step, the processor 200 verifies whether the value NB_Timer_Dec is nonzero. Stated otherwise, the processor 200 verifies whether another Timer has started.

If the value NB_Timer_Dec is nonzero, the processor 200 must wait to take a common and simultaneous decision with the other synchronous communication modules SCM. The processor 200 then goes to step E830. If the value NB_Timer_Dec is zero, the processor 200 has the same information as all the other synchronous communication modules SCM and can rule on the set of links of the communication system. The processor 200 then goes to step E828.

In step E828, the processor 200 verifies whether the value of the variable $NB_{link\_evol}$ is zero. If the value of the variable $NB_{link\_evol}$ is zero, the processor 200 goes to step E829. Otherwise, the processor 200 goes to step E830.

In step E829, the processor 200 triggers a timeout equal to $D_{mem}$ of a duration for example of $N*(\delta+G)$. The timeout $D_{mem}$ ensures the validity of a stable state of the communication system during a minimum of time. In the same step, the index of the data transmission cycle SDTC and the number of the packet Pk_Radio, during which the stability decision for the state of the communication system has been made are stored.

In step E825, the processor 200 verifies whether it is a storage period for a state of the stable communication system. Accordingly, the processor 200 verifies that a lag $D_{mem}$ is strictly positive. In the negative, the processor 200 goes to step E830. In the affirmative, the processor 200 goes to step E826 and stores the state of the communication system then corresponding to the set of values of the measurements of the matrix EVM. In this same step, the processor 200 reinitializes the variable $D_{mem}$ to the value −1 and calculates the start of the state stored by the formula $T_{start}=SDTC_{sta}*\Delta+Pk\_R_{sta}*(\delta+G)$, where $SDTC_{sta}$ and $Pk\_R_{sta}$ correspond to the values stored during step E829.

This operation having been performed, the processor 200 goes to step E830. In this step, the processor 200 calculates in accordance with a particular mode of the present invention, the duration of the stability of the communication system, prior to the first detection of instability of a link. This step will be described in greater detail with reference to FIG. 8d.

Figure 8C:
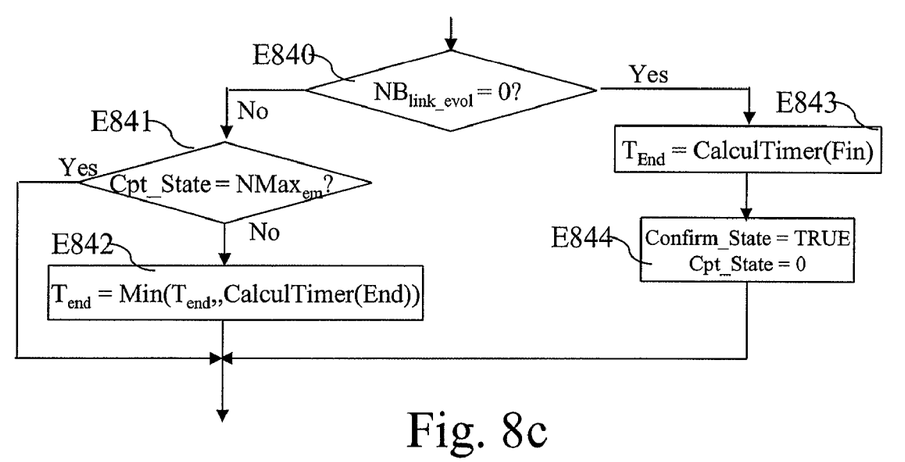

The algorithm of FIG. 8c describes in detail step E809 of FIG. 8a.

In step E840, the processor 200 verifies whether the value of the variable $NB_{link\_evol}$ is zero. If the value of the variable $NB_{link\_evol}$ is zero, this signifies that the communication system goes from a stable state to an unstable state. The processor 200 then goes to step E843. Otherwise, the processor 200 goes to step E841.

In step E843, the processor 200 determines the value of the instant $T_{end}$. This operation will be described in greater detail with reference to FIG. 8e.

In the following step E844, the processor 200 initializes the variables Confirm_State to TRUE and Cpt_State to 0. These variables will be used to adjust the calculation of the value $T_{end}$, so as to take into account the first link instability actually encountered in the communication system. Specifically, by dint of the retransmission mechanism and the possible maskings in the communication network, it is possible to determine the instability of a link that arose more recently than another instability that appeared previously. Likewise, the order of study of the stability/instability of the links can lead to considering the evolution of a more recent characteristic than the first evolution that was able to modify the state of the communication system.

Consider the case where $M_{12}$ and $M_{34}$ are the first measurements which cause the detection of an instability. By referring to the order described in the matrix MTM of FIG. 4, several cases are possible:

$M_{12}$ and $M_{34}$ lie in the Radio packet Pk_Radio(1). The order of study is therefore $M_{12}$ then $M_{34}$. However, according to column 400 of the matrix MTM, the measurement $M_{34}$ is older ($4^{th}$ transmission and relating to the data transmission cycle $SDTC_{current}-2$) than the measurement $M_{12}$ ($1^{st}$ transmission and relating to the data transmission cycle $SDTC_{current}-1$). In this case, the adjustment previously mentioned is necessary.

$M_{12}$ and $M_{34}$ lie in the Radio packet Pk_Radio(3). The order of study is $M_{12}$ then $M_{34}$. According to column 402 of the matrix MTM, the measurement $M_{34}$ is more recent ($1^{st}$ transmission and relating to the data transmission cycle $SDTC_{current}-1$) than the measurement $M_{12}$ ($3^{rd}$ transmission and relating to the data transmission cycle $SDTC_{current}-1$). In this case, the adjustment previously mentioned is not needed.

In step E841, the processor 200 verifies whether the value of the Cpt_State variable is equal to the value $NMax_{em}$. If it is, the period for determining the value of $T_{end}$ has terminated. If it is not, the processor 200 goes to step E842 and an estimation is restarted for the value of $T_{end}$ which corresponds to the minimum value of the previous determination of $T_{end}$ and of the new calculated value $T_{end}$.

Figure 8D:
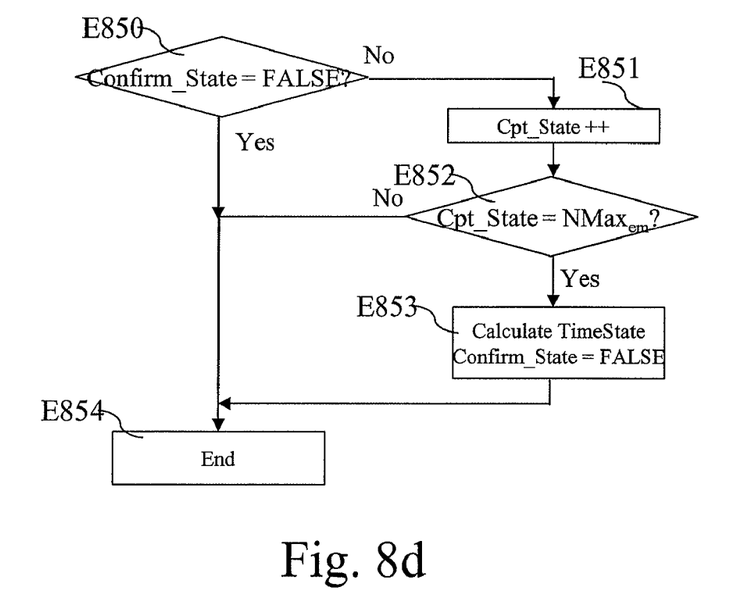

In step E850 of FIG. 8d, the processor 200 verifies whether the Confirm_State variable is equal to FALSE.

If the Confirm_State variable is equal to FALSE, the processor 200 returns to step E800 of the algorithm of FIG. 8a.

If the Confirm_State variable is equal to TRUE, the processor 200 goes to step E851.

In step E851, the processor 200 increments the Cpt_State variable.

In the following step E852, the processor 200 compares the value of the Cpt_State variable with $NMax_{em}$.

If the value of the Cpt_State variable is different from $NMax_{em}$, the processor 200 returns to step E800 of the algorithm of FIG. 8.

If the value of the Cpt_State variable is equal to $NMax_{em}$, the processor 200 goes to step E853 and determines the duration, stored during step E826, of the stability state of the network. The values $T_{start}$ and $T_{end}$ of this stored state are then available. Once this duration has been calculated, the Confirm_State variable is reset to the value FALSE, so as to perform steps E851 to E853 only during the next discovery of a link characteristic modifying the stability of the communication system.

Figure 8E:
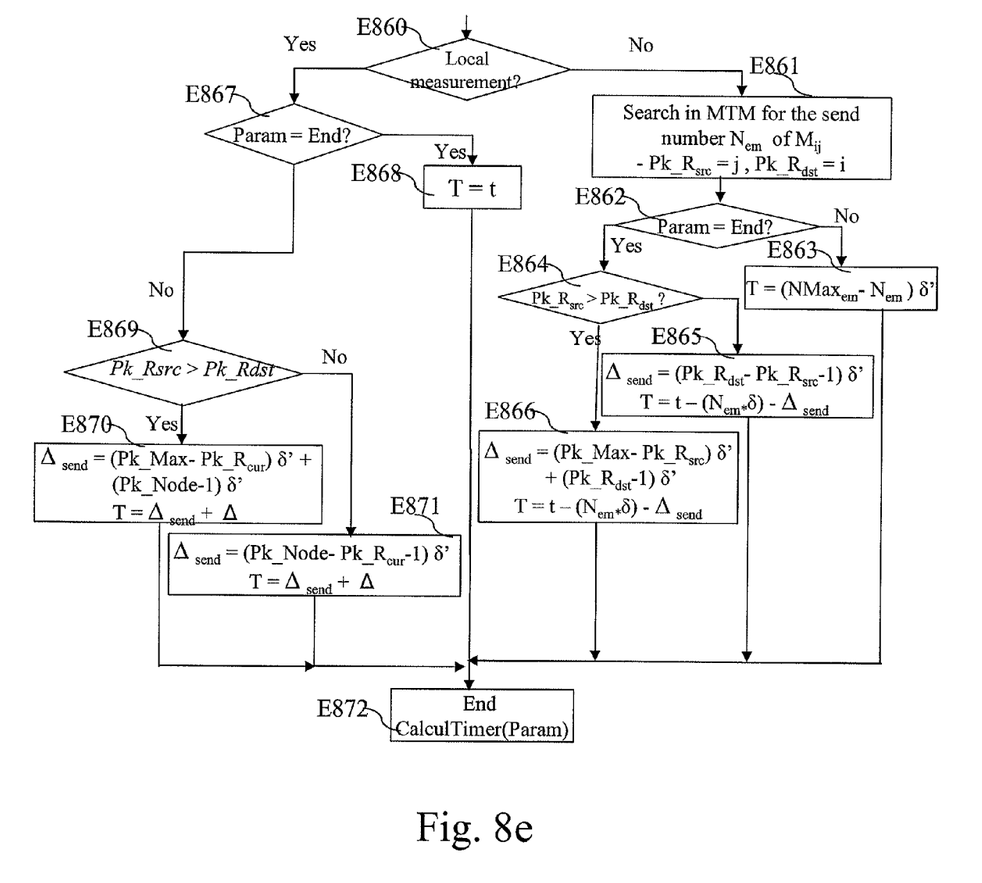

FIG. 8e describes the procedure for calculating the value $T_{end}$ and the lag $T_{dec}$.

To differentiate which is the calculation to be performed, the parameter Param takes either the value "End" for $T_{end}$ or the value "Decision" for $T_{dec}$.

In step E860, the processor 200 verifies whether the measurement $M_{ij}$ has been performed by the synchronous communication module SCMi or whether the measurement has been read from a packet Pk_Radio received. It should be noted here that when the measurement $M_{ij}$ is a local measurement, that is to say performed by the synchronous communication module SCMi, this measurement is performed during the speech time of the synchronous communication module SCMj and will be transmitted only during the next speech time of the synchronous communication module SCMi. It is then necessary to take into account this additional lag in the synchronous communication module SCMi to determine the instant at which the measurement $M_{ij}$ will be available to all the other synchronous communication modules SCM.

If the measurement $M_{ij}$ is a local measurement, the processor 200 goes to step E867. Otherwise, the processor 200 goes to step E861.

In step E867, the processor 200 verifies whether the value of the variable Param is equal to End.

If the value of the variable Param=End, the processor 200 goes to step E868 which consists in returning the value of the current instant t as value T of $T_{end}$. Specifically, for a local measurement, the end of the stability of the communication system corresponds to the instant when this measurement is performed. The determination having terminated, the processor 200 then completes the procedure by going to step E872.

If the value of the variable Param=Decision, the processor 200 goes from step E867 to step E869. In step E869, the processor 200 compares the value of k stored in the variable $Pk\_R_{cur}$ of the radio packet Pk_Radio(k) that allowed the local measurement with the value i stored in the variable $Pk\_R_{dst}$ of the radio packet Pk_Radio(i) denoted here Pk_N-ode in which the synchronous communication module SCMi will be able to send the measurement.

This operation makes it possible to perform the correct calculation of the lag before data sending, by taking into account the order of sending of each synchronous communication module SCM.

If (k>i) or if ($Pk\_R_{cur}>Pk\_R_{dst}$) the processor 200 goes to step E870. Otherwise, the processor 200 goes to step E871.

In step E870, the processor 200 calculates the value of $\Delta_{send}$ according to the following formula:

$$\Delta_{send}=(Pk\_Max-Pk\_R_{cur})*\delta'+(Pk\_Node)-1)*\delta'$$
where $\delta'=(\delta+G)$, $Pk\_Max=K$, $Pk\_R_{cur}=k$.

In this same step, the processor 200 calculates the value $T_{dec}=T=\Delta_{send}+\Delta$.

This operation having been performed, the processor 200 goes to step E872.

In step E871, the processor calculates the value of $\Delta_{send}$ according to the following formula:

$$\Delta_{send}=(Pk\text{-}Node-Pk\_R_{cur}-1)*\delta'.$$

In this same step, the processor 200 calculates the value $T_{dec}=T=\Delta_{send}+\Delta$.

This operation having been performed, the processor 200 goes to step E872.

The procedure is completed during step E872.

In step E861, the processor 200 then reads from the table MTM the number $N_{em}$ of sending of the measurement $M_{ij}$ of the link. In this same step, the processor 200 also initializes two variables $Pk\_R_{src}$ and $Pk\_R_{dst}$ to the radio packet numbers i and j corresponding to the measurement $M_{ij}$.

In step E862, the processor 200 verifies whether the value of the variable Param is equal to end.

If the value of the variable Param=End, the processor 200 goes to step E864.

If the value of the variable Param=Decision, the processor 200 goes to step E863 and calculates the lag remaining between the last send of the measurement and the current send. It therefore corresponds to a time:

$T=T_{dec}=(NMax_{em}-N_{em})*\delta'$ where $NMax_{em}=K$. This operation having been performed, the processor 200 goes to step E872.

In step E864, the processor 200 compares the values $Pk\_R_{src}$ and $Pk\_R_{dst}$.

If ($Pk\_R_{src}>Pk\_R_{dst}$) then the processor 200 goes to step E866 and calculates $\Delta_{send}$ according to the following formula: $\Delta_{send}=(Pk\_Max-Pk\_R_{src})*\delta'+(Pk\_R_{dst}-1)*\delta'$.

This time is thereafter subtracted from the current instant t from which is also subtracted the time corresponding to the sending lag which has been used to receive this measurement, i.e. the value ($N_{em}*\delta'$).

This operation having been performed, the processor 200 goes to step E872.

If ($Pk\_R_{src} \leq Pk\_R_{dst}$) then the processor 200 goes to step E865 and calculates $\Delta_{send}$ according to the following formula: $\Delta_{send}=(Pk\_R_{dst}-Pk\_R_{src}-1)*\delta'$.

This time is thereafter subtracted from the instant t from which is also subtracted the time corresponding to the sending lag which has been used to receive this measurement, i.e. the value ($Nem*\delta'$). This operation having been performed, the processor 200 goes to step E872.

Of course, the present invention is in no way limited to the embodiments described here, but encompasses, quite to the contrary, any variant within the scope of the person skilled in the art and particularly the combination of various embodiments of the present invention.

This application claims priority from French application no. 07/08396 filed on 30 Nov. 2008, which is hereby incorporated by reference in its entirety.

PCT application no. PCT/EP2008/057429 filed on 12 Jun. 2008 is an equivalent of FR 0755799 referred to on page 17 of the present application and is hereby incorporated by reference in its entirety. A copy of PCT application no. PCT/EP2008/057429 is attached as Appendix A.

French patent application no. 07/55799 filed on 15 Jun. 2007 is referred to on page 17 of the present application and is hereby incorporated by reference in its entirety.

The invention claimed is:

1. A method for managing a first communication device following modification of at least one reception condition for signals in a communication system, which communication system includes a plurality of communication devices including the first communication device, wherein the method is executed by the first communication device and comprises:
   detecting at least one modification of the reception conditions for signals in the communication system;
   determining an instant at which at least one second communication device will have detected the at least one modification of the reception conditions for the signals;
   varying a parameter of the first communication device in response to the modification of the reception conditions, the variation being effected at a time determined based on the determined instant;

sending in a first time interval of a transmission cycle, information representative of the reception conditions for signals received by the first communication device; and receiving information representative of the reception conditions for signals received by the at least one second communication device from the at least one second communication device in at least one second time interval of the transmission cycle.

2. A method according to claim 1, wherein the instant at which at least one second communication device will have detected the modification of the reception conditions for the signals is determined as a function of the position of the first time interval with respect to the at least one second time interval in the set of time intervals.

3. A method according to claim 2, comprising sending, in the first time interval, information representative of the reception conditions for signals received by the at least one second communication device.

4. A method according to claim 3, wherein the information representative of the reception conditions for signals received by the first communication device and the information representative of the reception conditions for signals received by the at least one second communication device are sent in the first time interval according to a predetermined order.

5. A method according to claim 4, wherein the at least one modification of the reception conditions for the signals is detected on the basis of variations of the information received or determined representative of the reception conditions with respect to other reception conditions stored in the first communication device.

6. A method according to claim 5, wherein the at least one modification of the reception conditions for the signals is detected on the basis of variations of the information received representative of the reception conditions if the information received has not been received previously.

7. A method according to claim 5, wherein detecting at least one modification of the reception conditions for the signals comprises:
a first determination of whether at least one variation in an item of information received or determined representative of a reception condition with respect to another reception condition stored in the first communication device is greater than a first predetermined threshold,
if the at least one variation is greater than the first predetermined threshold, a second determination whether all the variations in new information received or determined representative of the reception conditions with respect to other new reception conditions stored in the first communication device are less than a second predetermined threshold, and
in the case of a second positive determination, detecting the modification of the signal reception conditions.

8. A method according to claim 7, wherein the modification of the reception conditions for the signals is detected if all the variations of the new information received or determined representative of the reception conditions with respect to the other new reception conditions stored in the first communication device are less than the second predetermined threshold during a predetermined time.

9. A method according to claim 1, wherein the communication system is a radio communication system.

10. A device configured to manage a first communication device following modification of at least one reception condition for signals in a communication system, which communication system includes a plurality of communication devices including the first communication device, wherein the device is included in the first communication device and comprises:

means for detecting at least one modification of the reception conditions for signals in the communication system, which reception conditions are measurements of a quality of signals received from others of the plurality of communication devices;

means for determining an instant at which at least one second communication device will have detected at least one modification of the reception conditions for the signals;

means for varying a parameter of the first communication device in response to the modification of the reception conditions, the variation being effected at a time determined based on the determined instant;

means for sending in a first time interval of a transmission cycle, information representative of the reception conditions for signals received by the first communication device; and means for receiving information representative of the reception conditions for signals received by the at least one second communication device from the at least one second communication device in at least one second time interval of the transmission cycle.

11. A computer-readable storage medium storing a computer program which, when it is loaded and executed by a processor in a device, causes the device to implement a method for managing a first communication device following modification of at least one reception condition for signals in a communication system, which communication system includes a plurality of communication devices including the first communication device, wherein the method comprises:

detecting at least one modification of the reception conditions for signals in the communication system, which reception conditions are measurements of a quality of signals received from others of the plurality of communication devices;

determining an instant at which at least one second communication device will have detected the at least one modification of the reception conditions for the signals;

varying a parameter of the first communication device in response to the modification of the reception conditions, the variation being effected at a time determined based on the determined instant;

sending in a first time interval of a transmission cycle, information representative of the reception conditions for signals received by the first communication device; and receiving information representative of the reception conditions for signals received by the at least one second communication device from the at least one second communication device in at least one second time interval of the transmission cycle.

12. A device configured to manage a first communication device following modification of at least one reception condition for signals in a communication system, which communication system includes a plurality of communication devices including the first communication device, wherein the device is included in the first communication device and comprises a controller configured to:

detect at least one modification of the reception conditions for signals in the communication system, which reception conditions are measurements of a quality of signals received from others of the plurality of communication devices;

determine an instant at which at least one second communication device will have detected at least one modification of the reception conditions for the signals;

vary a parameter of the first communication device in response to the modification of the reception conditions, the variation being effected at a time determined based on the determined instant;

send in a first time interval of a transmission cycle, information representative of the reception conditions for signals received by the first communication device; and receive information representative of the reception conditions for signals received by the at least one second communication device from the at least one second communication device in at least one second time interval of the transmission cycle.

* * * * *